United States Patent [19]

Branchini

[11] 4,235,100
[45] Nov. 25, 1980

[54] COMPREHENSIVE COOLANT SYSTEM TESTER

[76] Inventor: Ricky A. Branchini, 7596 Hillsdale, Pleasanton, Calif. 94566

[21] Appl. No.: 74,982

[22] Filed: Sep. 13, 1979

[51] Int. Cl.³ ............................................. G01M 3/32
[52] U.S. Cl. .................................... 73/49.7; 73/49.8; 73/115
[58] Field of Search ...................... 73/45.8, 49.7, 49.8, 73/40, 115, 116, 756, 736; 138/90

[56] References Cited

U.S. PATENT DOCUMENTS

| | | | |
|---|---|---|---|
| 2,225,964 | 12/1940 | Bailey | 73/45.8 |
| 2,847,851 | 8/1958 | Enell | 73/40 |
| 2,940,301 | 6/1960 | Hughes et al. | 73/40 |
| 2,940,303 | 6/1960 | Enell | 73/45.8 |
| 2,981,095 | 4/1961 | Eshbaugh | 73/45.8 |
| 3,014,361 | 12/1961 | Black | 73/40 |
| 3,054,427 | 9/1962 | Bonnette | 138/90 |
| 3,138,949 | 6/1964 | Pipes | 73/45.8 |
| 3,213,672 | 10/1965 | Orr | 73/45.8 |
| 3,313,144 | 4/1967 | Johnson | 73/49.7 |
| 3,623,372 | 11/1971 | Markey | 73/49.7 |
| 3,650,147 | 3/1972 | Moyer | 73/49.7 |
| 3,680,361 | 8/1972 | Taylor | 73/45.8 |

Primary Examiner—Donald O. Woodiel
Attorney, Agent, or Firm—Poms, Smith, Lande & Rose

[57] ABSTRACT

A comprehensive automotive cooling system testing apparatus allows for the separate testing of the radiator and the engine block cooling passageways, in addition to the testing of the radiator cap and the complete cooling system. The testing apparatus includes a master pressurizing test unit, and adaptors to attach the unit to the various portions of the cooling system. The master pressurization test unit includes a gauge for visually observing the level of pressure, an air inlet for connecting the device to an external source of pressurized air, a manual pressure relief valve for releasing pressure when the testing is finished, and an automatic pressure relief valve for releasing pressure from the portion of the cooling system under test whenever the pressure reaches a predetermined level. The various portions of the master test unit are mounted to an air conduit which is attached to a cap similar to a radiator cap. A cylindrical adaptor is used to attach the master pressuring test unit to test a radiator filler cap. A hollow stepped cylindrical member is utilized to attach the master pressurizing test unit to a radiator hose when the radiator or engine block portions of the cooling system are to be separately tested. Solid stepped plugs are also provided for insertion into the other coolant hoses to seal the hoses.

25 Claims, 7 Drawing Figures

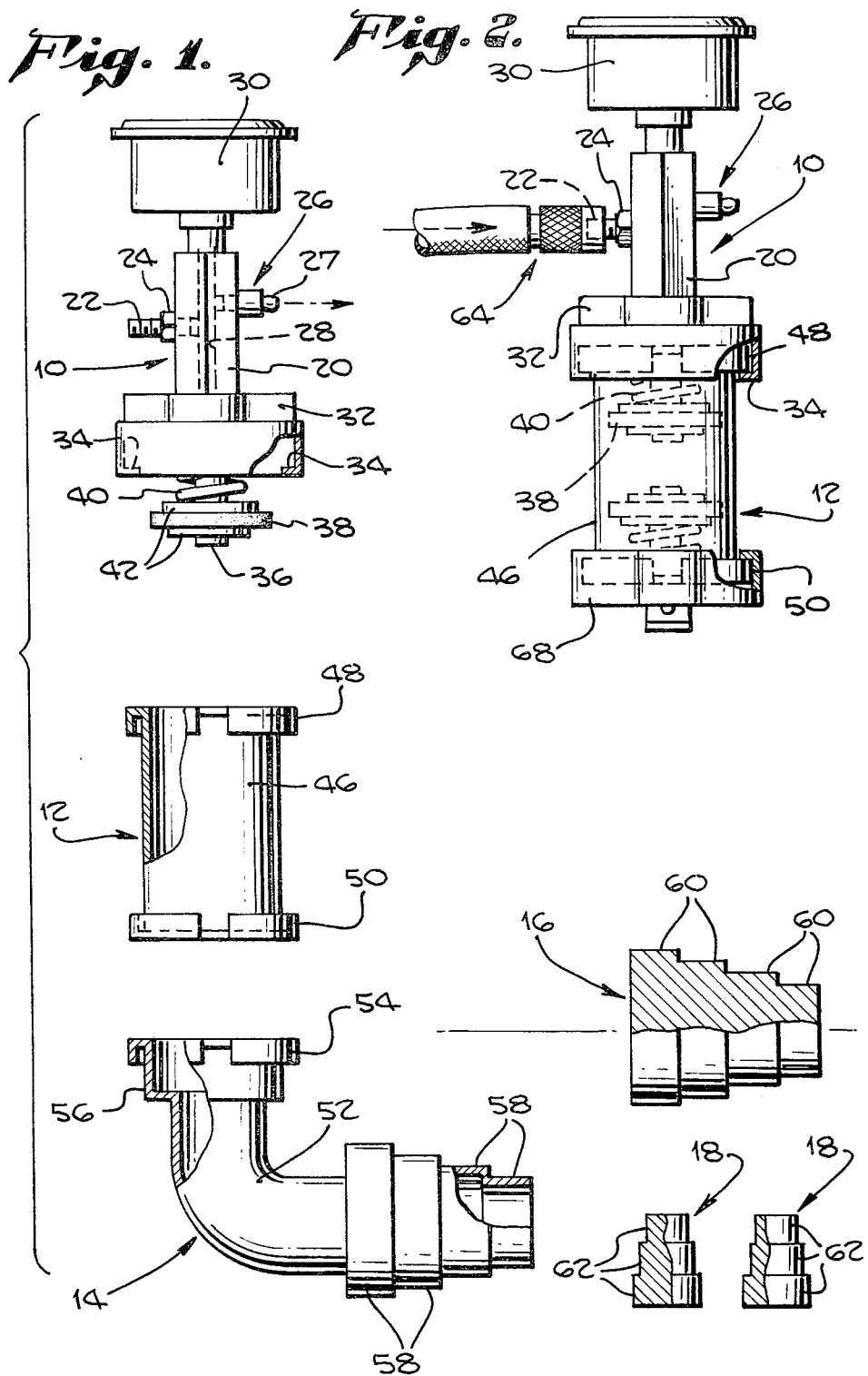

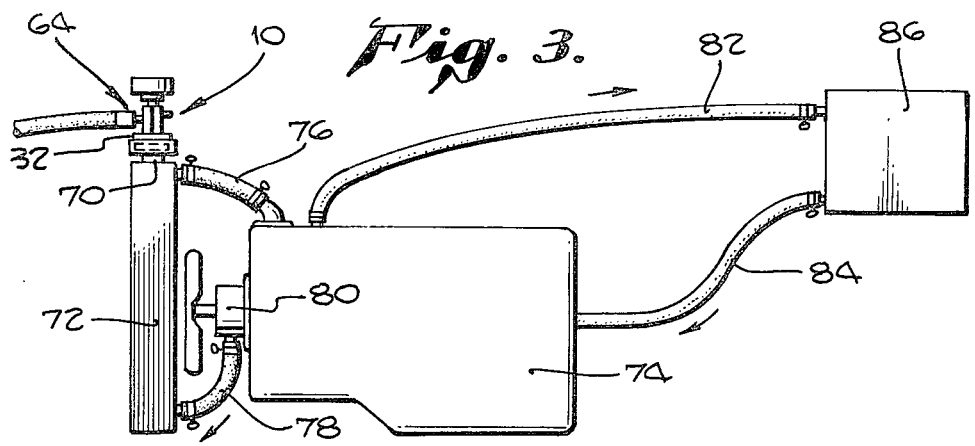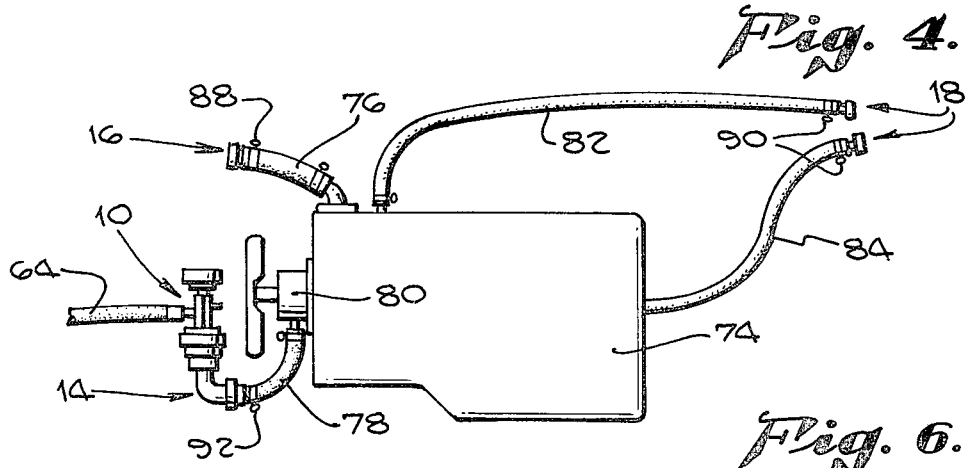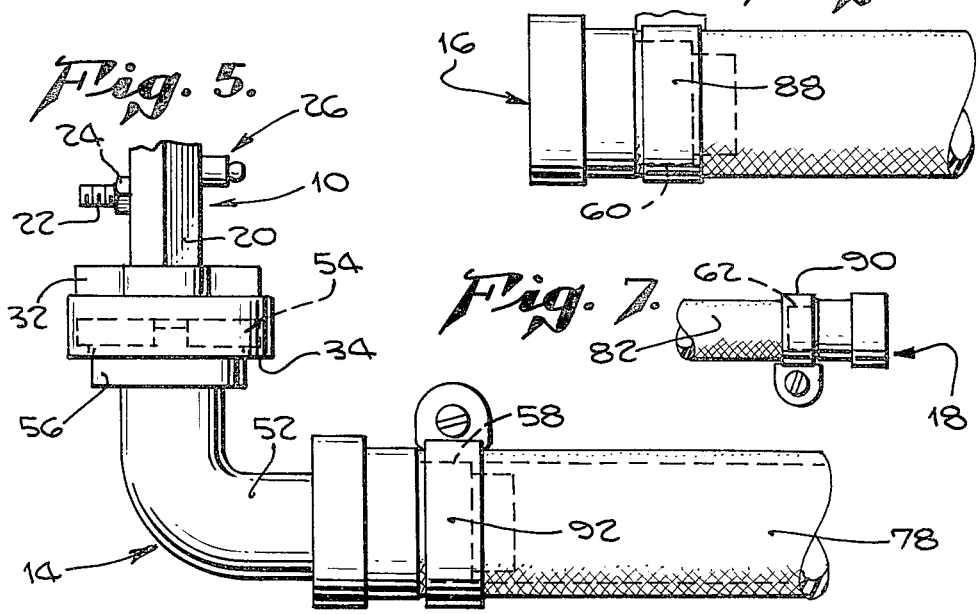

COMPREHENSIVE COOLANT SYSTEM TESTER

FIELD OF THE INVENTION

This invention relates to devices which pressure test the cooling systems of internal combustion engines, and in particular to those devices which test, in separate or combined fashion, the individual components of the cooling system.

BACKGROUND OF THE INVENTION

A majority of the cars and trucks in use today utilize water-cooled engines. The cooling system of such engines employs flow paths within the engine block, a water pump, and a radiator through which a cooling medium such as water or antifreeze circulates under pressure. The water pump is usually mounted on the front of the engine and connects to the flow paths in the engine and to the lower of the two hoses typically passing from the radiator. The upper radiator hose connects directly to the flow paths in the engine block. In this manner, a complete flow path through the engine and radiator for the cooling medium is created. A thermostat is usually used within the flow path to restrict circulation of the cooling medium when the engine is operating below the desired temperature.

Within the cooling system of most vehicles is a heater which connects between the flow paths in the engine block and the water pump. Hot water passes from the engine block into the heater and then returns into the water pump.

The amount of pressure developed in such cooling systems depends to a large extent on the temperature of the coolant and the speed at which the engine is operating. Thus, at high speed, or when the coolant is at a high temperature, such as when the vehicle is idling in traffic, the pressure of the cooling medium can be very high. Since the cooling system is designed to be a closed system, any minor leaks present in the system may result in excessive loss of coolant when the pressure in the system begins to rise. As the cooling medium is lost through such leaks, the capability of the cooling system to keep the engine temperature from rising above a normal operating level begins to decrease. If enough of the cooling medium is lost, the engine could overheat, with subsequent damage to the engine.

It is thus well-known that the cooling systems of water-cooled internal combustion engines should be pressure-tested periodically in order to detect the presence of leaks therein. The devices found in the prior art for testing the cooling systems of vehicles typically fall into two groups. The first of these groups are devices which are designed to simply test the radiator and/or the radiator filler cap. Such devices usually comprise a small air pump and gauge. When these devices are used to check the radiator filler caps, the cap is connected directly to the device, air is pumped into it, and the gauge reading is observed as the valve in the filler cap opens. When these devices are utilized to check the radiator, the filler cap is removed from the radiator, and the radiator inlet and outlet ports are sealed. Pressure is then applied to the radiator until the radiator is at its rated pressure level. If no air escapes from the radiator, it is presumed to be working properly.

The other group of devices are those designed to test the cooling system as a whole. In such devices, pressure is applied to the complete cooling system via a special radiator cap or, for example, by special conduits which connect to the heater connections on the engine. The cooling system of the engine is then pressurized with air via an air pump or an external source of compressed air and the pressure capacity of the cooling system is observed as a gauge.

None of the devices in the two groups described above allows testing of only the portion of the cooling system within the engine, i.e., the flow passages in the engine block and the water pump. In vehicles which are rather old, or which have been subject to a freeze-up, the cooling system may have leaks at both the radiator and within the engine block. The pressure testing devices which check only the radiator, or which check only the radiator when connected to the rest of the cooling system will not normally detect the leaks within the engine block, as the radiator leaks will be the ones that are immediately apparent when pressure is applied to the cooling system. Thus, the ability to test the cooling system with the radiator removed readily facilitates the pinpointing of a leak in the cooling system within the engine.

Additionally, many of the devices in the prior art require the use of a manual hand pump for the insertion of the pressure into the system and lack any means to automatically release the pressure past a certain predetermined level to avoid damaging the cooling system components. Also, as described, the devices found in the prior art are generally restricted to testing either the radiator and the filler cap or the cooling system as a whole, and do not have the capability to individually test each portion of the system. It would be most convenient, therefore, to provide a device which not only separately checks each individual portion of the cooling system, but which also utilizes air from an external source of compressed air, and further includes a pressure relief valve to release the pressure in the cooling system when the system is being tested to avoid damage to the cooling system components when the pressure reaches a predetermined level.

Accordingly, it is an important object of this invention to pressure test the cooling system of an internal combustion engine with the radiator and heater portions of the system disconnected.

It is an additional object of this invention to perform such pressure testing, and the comprehensive testing of the remainder of the cooling systems, in a simple and uncomplicated manner, and using a mimimum number of parts.

It is a further object of this invention to separately test the radiator, the radiator filler cap, and the portions of the cooling system within the engine.

It is still another object of this invention to pressure test the various components of the engine through the use of an external source of compressed air.

It is a final object of this invention to allow the manual release of the pressure in the cooling system under test when the test has been completed, and to allow the automatic releasing of pressure from the cooling system under test when a predetermined level of pressure has been surpassed.

SUMMARY OF THE INVENTION

The present invention, in a broad aspect, provides a comprehensive automotive cooling system testing apparatus which tests, individually or as a complete system, the radiator, the radiator filler cap, and the cooling passages within the engine block. The testing apparatus may be utilized with radiator hoses of various diameter. The apparatus includes a master pressuring test unit which selectively pressurizes one or all of the above portions of the cooling system with air, an adaptor for connecting the master pressuring test unit to the radiator cap when the cap is to be tested, and another adapting assembly for connecting the master pressuring test unit to the radiator or to the engine block when those portions of the system are to be tested. Accordingly, a single master pressurization unit may be employed to accomplish the entire cooling system testing procedure.

In accordance with one feature of the invention, the master pressuring test unit includes a cap which sealingly engages either of the adaptors. To this cap is connected an air conduit. At one end of the conduit is mounted a low-pressure, Bourdon-type gauge which monitors the pressure within the portion of the cooling system under test. The air conduit contains a spring-biased air inlet valve which allows pressurized air to enter the device under test from an external source of pressurized air and which prevents air from escaping the device when the source of pressurized air is removed. Adjacent the air inlet valve is a manual pressure release, which allows pressure to be released from the portion of the cooling system under test when the test has been completed. Also, the cap contains an automatic pressure relief valve which automatically releases pressure from the portion of the cooling system under test when the pressure reaches a predetermined level. Both the manual and automatic pressure release valves are spring-biased.

In accordance with another feature of the invention, the master pressuring test unit may be utilized to check the complete cooling system by the mounting of the cap portion of the unit directly upon the radiator filling mouth. The cap portion of the unit sealingly engages the radiator filling mouth to prevent air from escaping while the cooling system is being tested. To test the cooling system, an external source of air is connected to the air inlet portion of the unit. Pressure is then applied to the cooling system and the gauge portion of the unit is observed to determine the level of pressure which the system will stand without leaking. When the test has been completed, the manual pressure relief valve is depressed and the air is allowed to escape.

In accordance with still another feature of the invention, the cylindrical adaptor used to connect the cap portion of the master pressuring test unit to a radiator filler cap comprises a cylindrical member having flanges at each end similar to those on the filling mouth of a radiator. The radiator cap is mounted at one end of the cylinder and the master pressuring test unit is mounted at the other end of the cylinder. In this manner, air from the external source of air pressurizes the cylinder and the radiator filling cap. The gauge on the master pressuring test unit is then observed to determine the pressure at which the radiator filling cap opens. In this manner, the radiator filling cap is easily tested, with the same master test unit employed to test the remainder of the system, as discussed above.

In accordance with still another feature of the invention, the adapting assembly utilized with the test unit to check either the radiator or the engine block portions of the cooling system includes a stepped, hollow cylindrical member having a plurality of adjacent sections of decreasing diameter at one end and having a flange similar to that on a radiator filling mouth at the other end. The adapting assembly also includes a large solid stepped plug having a plurality of adjacent sections of decreasing diameter. The hollow cylindrical member and the stepped plug are each designed to be inserted into one end of a radiator hose. To test the radiator and cap together, the solid stepped plug is inserted into one of the free radiator hoses and the master pressure testing unit is attached to the other radiator filling hose. Pressure is applied as described above and the integrity of the radiator is thereby determined.

To separately test the engine block portion of the cooling system by itself, the radiator hoses are disconnected at the radiator, and any heating system hoses are disconnected from the vehicle firewall. Small solid stepped plugs are inserted into the free heater hoses and one of the standard solid stepped plugs is inserted into one of the free radiator hoses. Into the other radiator hose is inserted the hollow, stepped cylindrical member with the test unit attached to it. Pressure is then applied to the engine block and its integrity checked in a manner similar to that for the other portions of the cooling system.

In accordance with a final feature of the invention, the automatic pressure relief valve in the cap portion of the unit automatically releases pressure from the portion of the cooling system under test whenever the pressure in that portion reaches approximately 25 lbs. per square inch. In this manner, use of the pressure testing device will not harm any portion of the cooling system.

Other objects, features, and advantages of the present invention will become apparent from a consideration of the following detailed description and of the appended drawings.

BRIEF DESCRIPTION OF THE DRAWINGS

FIG. 1 shows side views of the various components of a comprehensive cooling system testing apparatus according to this invention;

FIG. 2 shows the testing apparatus of FIG. 1 configured to test the radiator cap portion of the cooling system;

FIG. 3 shows the testing apparatus of FIG. 1 configured to test the complete cooling system;

FIG. 4 shows the apparatus of FIG. 1 configured to test the engine block portion of the cooling system;

FIG. 5 shows a detailed view of the attaching of the testing apparatus to a radiator hose when the apparatus is used to test the engine block, as shown in FIG. 4;

FIG. 6 shows a detailed view of the attaching of one of the stepped plugs into the other radiator hose when the testing apparatus is used to test the engine block, as shown in FIG. 4; and FIG. 7 shows a detailed view of the attaching of one of the small stepped plugs into a heater hose when the testing apparatus is used to test the engine block, as shown in FIG. 4.

DETAILED DESCRIPTION

Referring to the drawings, FIG. 1 shows a side view of the various components utilized in a comprehensive automotive cooling system testing apparatus, according to the present invention, which allows the separate or combined testing of the radiator, radiator filler cap, and engine block cooling passage portions of the cooling system. The primary component of the apparatus is the master pressurization unit, generally denoted 10, by which pressure is applied to the particular portion of the cooling system under test and by which a visual indication of the structural integrity thereof is obtained. The other components of the apparatus are a cylindrical radiator cap adaptor, generally denoted 12, for connecting the master test unit 10 to a radiator cap, a cylindrical radiator hose adaptor 14, for connecting the master pressuring test unit 10 to one of the two radiator hoses in the cooling system, a solid stepped plug 16 for sealing the other radiator hose, and a pair of smaller stepped plugs 18 for sealing the heater hoses. These various components are not all used simultaneously. Rather the adaptors 12 and 14 and the plugs 16 and 18 are selectively used with the master pressurization test unit 10 as the various portions of the cooling system are tested.

Regarding the specific construction of the master pressuring test unit 10, it is seen from FIG. 1 that the device 10 includes an air conduit 20 having a passage 28 therein. To one end of the air conduit 20 is connected a low-pressure gauge 30. The gauge is generally calibrated to read up to approximately 30 psi and may be a Bourdon-type gauge. Attached to the other end of the conduit 20 is a cap 32 similar to that found in automobiles. The connections between the air conduit 20 and the gauge 30 and cap 32 are ideally leakless to prevent the escape of air. In practice, as automobile cooling systems are not designed to operate above 25 psi, the connection between the conduit 20 and the gauge 30 and cap 32 need only have integrity up to 25 psi.

Connected to the other side of air conduit 20 and communicating with the internal passage 28 therein are an air inlet valve 24 and a manual pressure release valve 26. The air inlet valve 22 may be a common automobile tire-type valve core and is attached to the air conduit 28 by means of a nut 24. The air inlet valve 22 is adapted to connect to a standard service station-type air filling hose and, accordingly, a spring within the valve, which is not separately shown, allows air to enter the valve 22 when a filling hose is attached thereto and prevents the loss of air when the filling hose is removed.

The manual pressure release valve 26 is similar in construction to the air inlet valve 22, except that it is adapted to only release pressure when the plunger portion 27 of the valve 26 has manual force applied to it. This feature allows pressure to be relieved from the portion of the cooling system under test when the testing has been completed.

As stated, the cap 32 portion of the master pressuring test unit 10 is similar in construction to radiator caps utilized with today's automobiles. In this regard, the cap 32 has two flanges 34 which attach to the filling mouth portion of a radiator. Similarly, within the cap 32 is a normal radiator-cap pressure release valve. The valve includes a shaft 36, a piston member 42, and a pliable piston seal 38. A spring 40 biases the shaft 36 and piston outwardly until a pressure of approximately $22 \geqq 25$ psi is applied against the piston 42, whereupon the biasing force of the spring 40 is overcome and the piston 42 moves into the cap and allows the pressure against it to escape through the openings between the flanges 34. The internal valve in the cap 32 functions as an automatic pressure release to prevent the particular portion of the cooling system under test from being damaged if the pressure applied to that portion reaches the vicinity of 25 psi, which is the highest amount of pressure at which most cooling systems will properly function.

The master pressuring test unit 10 is connected to a radiator cap by means of the cylindrical radiator cap adaptor 12. The radiator cap adaptor 12 includes a generally cylindrical member 46 of metal or other material capable of withstanding 25 psi. At each of the cylinder 46 is a coupling flange 48 and 50. The flanges 48 and 50 are each identical to the coupling flange arrangements found on radiator filling mouths.

The cylindrical radiator hose adaptor 14 also includes a generally cylindrical member 52, having a 90 degree bend in it to facilitate its connection to a radiator hose. At one end of the cylindrical member 52 is a shoulder 56 having thereon a pair of flanges 54, which are also identical to these found on the filling mouths of radiators. At the other end of the cylindrical member 52 are a plurality of adjacent cylindrical steps 58 of decreasing diameter. These steps 58 allow use of the radiator hose adaptor 14 with radiator hoses of various size. As is the case with the radiator cap adaptor 12, the radiator hose adaptor 14 is constructed of a material capable of withstanding approximately 25 psi.

The radiator hose plug 16 is identical in shape to the stepped end of the radiator hose adaptor 14, except that it is solid. In this manner, the adjacent cylindrical sections of decreasing diameter 60 will completely seal a radiator hose into which the plug 16 is inserted. The smaller plugs 18 are also solid and have on their outer surface a plurality of steps 62. The steps 62 assist the smaller plugs 18 and completely sealing the heater hoses.

FIG. 2 shows the comprehensive cooling system testing apparatus utilized to test a radiator cap 68. In this regard, the master pressuring test unit 10 is connected to the radiator cap adaptor 12 and the resulting assembly is connected to the cap 68. An air hose 64 from a source of pressurized air is connected to the air inlet valve 22. Air is then applied into the apparatus and the resulting pressure is monitored on the air gauge 30. The pressure against the cap 68 is slowly increased until the cap is at its rated pressure level. If no air escapes from the cap, the test is deemed successful. To end the test, the plunger 27 portion of the manual pressure release valve 26 is depressed and the air escapes from the apparatus. The radiator cap 68 is then removed.

FIG. 3 shows the testing apparatus configured to test the complete cooling system of an engine. It is to be understood that the cooling fluid need not be removed from the system prior to the test being performed. To test the complete cooling system, the master pressuring test unit 10 is connected directly to a filling mouth portion 70 of a radiator 72. An air hose 64 is connected to the air inlet valve 22 and pressure is applied to the complete cooling system. The pressure within the system is observed on the air gauge 30. In this manner, the radiator 72, radiator hoses 76 and 78, water pump 80, engine block 74, heater hoses 82 and 84, and heater core 86 are completely pressurized. Any leak within the system will be immediately apparent when the air gauge 30 indicates a loss of pressure. As before, when the test is completed, the plunger 27 on the manual pressure release valve 26 is depressed, which allows the pressure to escape from the system and the master pressuring test unit 10 has been removed. As mentioned, the valve assembly in the cap 32 portion of the master pressuring test unit 10 automatically protects the system by insuring that the system is not pressurized past 25 psi.

FIG. 4 shows the cooling system testing apparatus configured to check only the cooling passages within the engine block 74. In this regard, the radiator 72 is disconnected from the radiator hoses 76 and 78. Additionally, the heater core 86 is disconnected from the heater hoses 82 and 84. The master pressuring test unit 10 is connected to the cylindrical radiator hose adaptor 14 and the complete assembly is connected into the lower or inlet radiator hose 78. As shown in FIG. 5, a hose clamp 92 is utilized to attach the lower radiator hose 78 to one of the steps 58 on the radiator hose adaptor 14. Into the upper or return radiator hose 76 is inserted the large stepped plug 16. As shown in FIG. 6, a hose clamp 88 is again used to affix the radiator hose 76 to the plug 16. The smaller stepped plugs 18 are inserted into the heater hoses 82 and 84 and a pair of clamps 90, as shown in FIG. 7, are utilized to clamp the hoses 82 to the plugs 18.

After the cooling system has been configured as described, a air hose 64 is connected to the air inlet 22 and the engine block is pressurized. As before, the air gauge 30 is observed to detect any leaks which would indicate a lack of structural integrity within the engine cooling passages or a faulty seal in the water pump 80.

The ability to test just the engine block portion of the cooling system represents a novel departure from the methods of testing cooling systems previously employed. As discussed, these methods generally only tested the radiator or the complete cooling system. Thus, if the radiator and engine block were both faulty, only the leak in the radiator would be detected. Additionally, the present apparatus also prevents unnecessary stress on the radiator if a leak in the engine block is suspected because the block can be separately tested from the radiator.

In a prototype version of the present apparatus, the radiator cap adaptor 12 was approximately 2 and ¾ inches long, and has an inside diameter of approximately 1 and ⅝ inches and a greatest outside diameter of approximately 2 and ¾ inches. The flanges 48 and 50 at each end of the adaptor 12 were standard radiator coupler fittings. Similarly, the radiator hose adaptor 14 was constructed on the standard radiator filler neck having an inside diameter of approximately 1 and ⅝ inches and a greatest outside diameter of approximately 2 and ¼ inches. Four steps 58 were utilized at the end of the cylindrical portion 52 of the adaptor 14, each step being approximately ⅝ of an inch wide, giving four sections of decreasing diameter having dimensions of approximately 2 inches, 1 and ¾ inches, 1 and ½ inches, and 1 and ¼ inches. The adaptor flanges 12 and 14 were constructed of metal, although, as mentioned, very high-strength material could be utilized. Regarding the stepped plugs 16 and 18, the radiator hose stepped plug 16 was a solid member of metal or molded rubber also having four steps 60, each approximately ⅝ inches in width, giving four steps having diameters of 2 inches, 1 and ¾ inches, 1 and ½ inches, and 1 and ¼ inches. The heater hose step plugs 18 were of similar construction and incorporated three shoulders 62, each ⅝ inch in width, giving the adjacent steps diameters of ¾ inches, ⅝ inches, and ½ inch. Completely satisfactory results were obtained with these dimensions.

The novel apparatus of the present invention, which allows the separate or combined testing of all portions of an automotive cooling system is in sharp contrast to the limited capabilities of the devices found in the prior art. For example, U.S. Pat. Nos. 2,940,301 (Hughes et al) and 2,940,303 (Enell) disclose testing apparatus adapted only to test the radiator cap portion of the cooling system and incorporate manual air pumps, as opposed to the air inlet of the present invention, which connects to a source of pressurized air. Also, U.S. Pat. Nos. 2,981,095 (Eshbaugh), 3,138,949 (Pipes), 3,213,672 (Orr) and 3,313,144 (Johnson) disclose apparatus adapted primarily to test the radiator and include no provisions for testing the engine block. Furthermore, U.S. Pat. Nos. 2,847,851 (Enell), 3,014,361 (Black), 3,100,391 (Mansfield), 3,623,372 (Markey), 3,650,147 (Moyer), and 3,680,361 (Taylor) disclose apparatus adapted primarily to test the complete cooling system and not the individual parts thereof.

In the foregoing description of the present invention, a preferred embodiment of the invention has been disclosed. It is to be understood that other mechanical and design variations are within the scope of the present invention. Thus, by way of example and not of limitation, the master pressuring test unit could utilize a different type of air gauge and the valves on the air conduit could be configured differently than described; a different type of automatic pressure release mechanism could be incorporated in the apparatus; the radiator cap adaptor could be longer or shorter than described; the master test unit could have a coupling configuration similar to that of the mouth of the radiator for direct connection to a radiator cap, with an adaptor being required for connection to the mouth of the radiator; the radiator hose need not necessarily be curved and could utilize more or less steps than described; and the plugs utilized to seal the radiator hose and heater hose may be configured differently to achieve the same results. Accordingly, the invention is not limited to the particular arangement which has been illustrated and described in detail herein.

What is claimed is:

1. A comprehensive automotive cooling system testing apparatus for testing all of the portions of said system, including the radiator filler cap, radiator, an engine block cooling passage portions of said system, not withstanding variations in radiator hose diameter or the like, said apparatus comprising:

master pressurization test means for selectively pressurizing said portions with air, said master test means including a central open chamber, means for connecting a source of pressurized air to said central open chamber, said means including a coupling for connecting said chamber to said portion under test, means for visually observing the level of pressure within said portion, and means for releasing said pressure from said portion, whereby the integrity of said portion is determined by the level of pressure said portion will withstand without leaking;

adapting means for securing to said coupling and for attaching said pressurizing means to said radiator filler cap portion of said system;

means for testing said radiator, with said radiator disconnected from said block via said radiator hoses, said testing means including stepped plug means for sealing at least one of said radiator hoses; and means for testing said block with said radiator disconnected, said means including stepped hollow cylindrical means for coupling said master test means to one of said hoses;

whereby a single master test means may be selectively employed to separately test (1) the filler cap (2) the entire coolant system excluding the filler cap, (3) the radiator and (4) the engine block.

2. A cooling system testing apparatus as defined in claim 1, wherein said means for connecting pressurized air comprises:

coupling cap means for selectively engaging in sealing relation said adapting means or said means for testing said radiator;

spring-biased air inlet valve means for allowing pressurized air to enter said portion under test from an external source of air and for preventing air from escaping from said portion when said source of pressurized air is removed; and air conduit means, including a central air chamber and connected to said cap means and containing said air inlet valve means, for passing air from said inlet valve means into said portion of said system under test through said cap means and for connecting said means for visually observing said level of pressure to said portion.

3. A cooling system testing apparatus as defined in claim 2, wherein said means for visually observing said level of pressure comprises a Bourdon-type low pressure gauge connected to said air conduit means.

4. A cooling system testing apparatus as defined in claim 2, wherein said means for releasing pressure from said portion of said cooling system under test comprises:

manually operable spring-biased valve means, attached to said air conduit means, for releasing pressure from said portion upon the manual application of a force against said valve means; and automatic spring-biased valve means, mounted in said cap means and disposed toward said portion of said cooling system under test, for automatically relieving pressure from said portion when said pressure reaches a predetermined level, thereby preventing damage to said portion.

5. A cooling system testing apparatus as defined in claim 2, wherein said adapting means comprises:

a hollow flanged tube sealingly connectable between said cap means and said radiator cap portion of said cooling system.

6. A cooling system testing apparatus as defined in claim 2, wherein said means for testing said radiator comprises:

a solid, cylindrical plug having a plurality of adjacent sections of decreasing diameter, said plug being insertable into one of said radiator hoses to seal said hose, with said master pressuring test means being inserted into the other of said hoses.

7. A pressure testing device as defined in claim 6, wherein said pressurizing means comprises:

gauge means for visually observing said level of pressure;

air inlet means for connecting a source of pressurized air to said cooling system;

manual pressure relief means for manually releasing pressure from said cooling system;

automatic pressure relief means for automatically releasing pressure from said cooling system when said pressure reaches a predetermined level; and means for coupling all aforesaid means to said radiator hose.

8. A pressure testing device as defined in claim 7, wherein said coupling means comprises:

a hollow cylindrical member having a plurality of adjacent sections of decreasing diameter, said member being inserted into said radiator hose and sealing said hose;

cap means, containing said automatic pressure release means, for sealingly engaging said cylindrical member;

air conduit means, connected between said cap means and said gauge means and containing said air inlet means and said manual pressure relief means, for passing air from said inlet means into said cooling system through said cap and said cylindrical member and for connecting said gauge means to said cooling system.

9. A pressure testing device as defined in claim 8, wherein said automatic pressure release means comprises:

a spring-biased valve member mounted within said cap means and disposed toward said cylindrical member, whereby, when pressure in said cooling system reaches a predetermined level, said valve opens and maintains said pressure at said predetermined level.

10. A pressure testing device as defined in claim 9, wherein said automatic pressure relief valve opens when said pressure reaches approximately 25 lbs. per square inch.

11. A pressure testing device as defined in claim 7, wherein said gauge means comprises:

a Bourdon-type low pressure gauge.

12. A pressure testing device as defined in claim 8, wherein said air inlet means comprises:

spring-biased valve means, connected to said air conduit means, for allowing pressurized air to enter said air conduit means from an external source of pressurized air and for preventing pressurized air from leaving said conduit means when said external source of pressurized air is removed.

13. A pressure testing device as defined in claim 8, wherein said manual pressure relief means comprises:

a manually-operable spring-biased valve connected to said air passage means and disposed to allow air to escape from said air conduit means only upon the application of a manual force to said valve.

14. A cooling system testing apparatus as defined in claim 2, wherein said means for testing said block comprises:

a hollow cylindrical member having a plurality of adjacent sections of decreasing diameter and adapted to connect to said cap means, said member being insertable into said one of said radiator hoses to sealingly connect said pressurizing means to said radiator hose.

15. A pressure testing system as defined in claim 1 wherein said master test means includes a cap having a configuration similar to that of the radiator filler cap; and wherein said stepped hollow cylindrical means includes a coupling configuration similar to that of the radiator mouth.

16. A device for pressure testing the liquid cooling system of an internal combustion engine of a vehicle, said cooling system being of the type having connected thereto by hoses a radiator and a vehicle heating system, said device allowing testing of said cooling system with said radiator and said heating system disconnected and comprising:

a plurality of solid cylindrical plug means for sealing said heating system hoses and one of said radiator hoses, said plug means each having a plurality of adjacent sections of decreasing diameter to seal said heating system hoses and one of said radiator hoses when said plug means are inserted therein;

cooling system pressuring means, connected to the remaining radiator hose, for pressurizing said cooling system with air, said pressurizing means including means for connecting a source of pressurized air to said cooling system, means for visually observing the level of pressure in such cooling system, and means for releasing said pressure in said cooling system to prevent damage to said system or to end said testing of said cooling system, whereby the integrity of said cooling system is determined by the level of pressure said cooling system withstands without leaking.

17. A pressure testing device as defined in claim 16, wherein said means for connecting pressurized air to said cooling system comprises:
 a hollow cylindrical member having a plurality of adjacent sections of decreasing diameter, said member being inserted into said remaining radiator hose to seal said hose;
 cap means for sealingly engaging said cylindrical member;
 spring-biased air inlet valve means for allowing pressurized air to enter said device from an external source of air and for preventing air from escaping said device when said source of pressurized air is removed;
 air conduit means, connected between said cap means and said means for visually observing said level of pressure and containing said spring-biased air inlet valve means, for passing air from said inlet valve means into said cooling system through said cylindrical member and said cap means and for connecting said means for visually observing said level of pressure to said cooling system.

18. A pressure testing device as defined in claim 16, wherein said means for visually observing said level of pressure in said cooling system comprises:
 a Bourdon-type low pressure gauge.

19. A pressure testing device as defined in claim 16, wherein said means for releasing pressure in said cooling system comprises:
 manually operable spring-biased valve means, attached to said air conduit means, for releasing pressure from said cooling system upon the manual application of a force to said valve means; and
 automatic spring-biased valve means, mounted in said cap means, and disposed toward said cylindrical member, for automatically relieving pressure from said cooling system when said pressure reaches a predetermined level in order to prevent damage to said cooling system, said level being determined by said spring-bias.

20. A pressure testing device as defined in claim 19, wherein said predetermined level is approximately 25 lbs. per square inch.

21. A device for pressure testing the cooling system of an internal combustion engine, said cooling system including cooling passages within said engine, a water pump circulating water through said passages, a radiator connected by two hoses to said passages and said water pump, said device allowing said cooling system to be tested with said radiator disconnected and comprising:
 plug means for sealing one of said radiator hoses; and
 master pressurization test means, adapted to connect to the other said radiator hose, for pressurizing said cooling system with air, whereby the integrity of said cooling system is determined by the level of pressure said cooling system withstands without leaking.

22. A pressure testing device as defined in claim 21, wherein said plug means comprises:
 a solid, cylindrical plug having a plurality of adjacent sections of decreasing diameter, said plug being inserted into said radiator hose to seal said hose, said diameters allowing said plug to be used with hoses of various size.

23. A comprehensive automotive cooling system testing apparatus for testing all portions of said system, including the radiator filler cap, radiator and engine block cooling passage portions of said system, notwithstanding variations in radiator hose diameter or the like, said apparatus comprising:
 (a) a pressurizing device for selectively pressurizing one or all of said portions of said cooling system, said pressurizing device including
  (i) a flanged cap,
  (ii) a spring-biased air inlet valve for allowing pressurized air to enter said device from an external source of air and for preventing air from escaping from said device when said external source of pressurized air is removed,
  (iii) a low-pressure gauge for monitoring the level of pressure within said portion of said cooling system being tested, and
  (iv) an air conduit, interconnecting said cap, said air valve, and said gauge, for passing air from said inlet valve to said gauge and to said portion of said system under test through said cap, whereby the integrity of said portion is determined by the level of pressure said portion will withstand without leaking, said pressurizing device being directly connectable to the filling neck of a radiator to test said radiator;
 (b) a hollow flanged adapting tube sealingly connectable between said cap and said radiator cap portion of said cooling system, said flanged cap thereby allowing said pressurizing device to test said radiator cap;
 (c) a stepped plug for sealing one of said radiator hoses to allow said pressurizing device to test said radiator, with said radiator disconnected from said engine block via said radiator hoses; and
 (d) a stepped flanged cylinder for coupling said pressurizing device to said engine block with said radiator disconnected.

24. A comprehensive automotive cooling system testing apparatus as defined in claim 23, wherein said pressurizing device further comprises:
 a manually operable spring-biased valve attached to said air conduit, for releasing pressure from said portion of said system under test upon the manual application of a force against said valve; and
 an automatic spring-biased valve, mounted in said cap, for automatically relieving pressure from said portion when said pressure reaches a predetermined level, thereby preventing damage to said portion.

25. A comprehensive automotive cooling system apparatus as defined in claim 23, wherein:
 said hollow cylindrical member includes a plurality of adjacent sections of decreasing diameter and a flange adapted to connect to said cap, said cylindrical member being insertable into one of said radiator hoses to sealingly connect said pressurizing device to said radiator hose; and
 said stepped plug includes a plurality of adjacent sections of decreasing diameter, said plug being inserted into the other of said radiator hoses to seal said hose.

* * * * *